(12) United States Patent
McLeod et al.

(10) Patent No.: US 7,094,856 B1
(45) Date of Patent: Aug. 22, 2006

(54) PROCESS FOR PRODUCING POLYOLEFIN

(75) Inventors: Michael A. McLeod, Kemah, TX (US); David Smith, LaPorte, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/189,179

(22) Filed: Jul. 25, 2005

(51) Int. Cl.
*C08L 23/16* (2006.01)

(52) U.S. Cl. .................... 526/348.1; 525/240; 524/584; 264/290.2; 264/291

(58) Field of Classification Search ............... 525/240; 526/348.1; 524/584; 264/290.2, 291
See application file for complete search history.

(56) References Cited

U.S. PATENT DOCUMENTS

| | | | |
|---|---|---|---|
| 3,952,073 A * | 4/1976 | Isaka et al. ................ | 525/240 |
| 2002/0032295 A1 * | 3/2002 | Peiffer et al. ............. | 526/348.1 |
| 2004/0014896 A1 * | 1/2004 | Datta et al. ................ | 525/240 |

\* cited by examiner

*Primary Examiner*—Fred Teskin
(74) *Attorney, Agent, or Firm*—William D. Jackson; Tenley R. Krueger

(57) ABSTRACT

Process for the production of an oriented polyolefin film using multi-component polymer compositions. One polymer component comprises an isotactic propylene homopolymer produced by the polymerization of propylene with a Ziegler-Natta catalyst. A secondary component is a Ziegler-Natta polymerized ethylene-propylene random copolymer or a metallocene-polymerized ethylene-propylene random copolymer produced by the polymerization of propylene and ethylene in the presence of a metallocene polymerization catalyst. The Ziegler-Natta polymerized copolymer is produced by the polymerization of ethylene and propylene in the presence of a Ziegler-Natta catalyst and contains no more than 0.5 wt. % ethylene and has a xylene solubles content of at least 2 wt. %. The primary and secondary polymer components are mixed together to provide a blend in which, when the secondary component is a Ziegler-Natta polypropylene, is present in an amount within the range of 5–25 wt. % and the secondary polymer component is a metallocene-based copolymer present in an amount of less than 5 wt. %. After mixing the two polymer components together, the mixture is extruded and the formed into a biaxially oriented film.

27 Claims, 7 Drawing Sheets

PROCESS FOR PRODUCING POLYOLEFIN

FIELD OF THE INVENTION

This invention relates to oriented polyolefin films, and more particularly to polyolefin film compositions which incorporate secondary polymer components to provide for improved processability.

BACKGROUND OF THE INVENTION

Biaxial orientation of polyolefins, particularly polypropylenes, produces films which have applications in the polyolefin film business, for example snack food packaging, cigarette overwrap, electronic components wrapping, packaging tape, and shrink film. The polymers normally employed in the preparation of biaxially oriented films are isotactic homopolymers with high stereoregularity, although on some occasions the use of syndiotactic polymers has been proposed. Also suitable are co-polymers of isotactic polypropylenes with a small content of ethylene (mini-random co-polymers).

Isotactic polypropylene is one of a number of crystalline polymers which can be characterized in terms of the stereoregularity of the polymer chain. Various stereospecific structural relationships denominated primarily in terms of syn-diotacticity and isotacticity may be involved in the formation of stereoregular polymers of various monomers.

Isotactic polypropylene is conventionally used in the production of relatively thin films in which the polypropylene is heated and then extruded through dies and subjected to biaxial orientation by stressing the film in both a longitudinal direction (referred to as the machine direction) and lateral direction (sometimes referred to as the tenter direction). The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain.

Stereoregular polymers, such as isotactic and syndiotactic polypropylene can be characterized in terms of the Fisher projection formula. Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

Syndiotactic polymers are semi-crystalline and, like the isotactic polymers, have few xylene-soluble species. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

SUMMARY OF THE INVENTION

In accordance with the present invention, there is provided a process for the production of an oriented polyolefin film using multi-component polymer compositions. One polymer component comprises an isotactic propylene homopolymer produced by the polymerization of propylene in the presence of a Ziegler-Natta catalyst. A secondary component is a Ziegler-Natta polymerized ethylene-propylene random copolymer or a metallocene-polymerized ethylene-propylene random copolymer produced by the polymerization of propylene and ethylene in the presence of a metallocene polymerization catalyst. The Ziegler-Natta polymerized ethylene-propylene random copolymer is produced by the polymerization of ethylene and propylene in the presence of a Ziegler-Natta catalyst and contains no more than 0.5 wt. % ethylene and has a xylene solubles content of at least 2 wt. %. The primary and secondary polymer components are mixed together to provide a blend in which, when the secondary component is a Ziegler-Natta polypropylene, is present in an amount within the range of 5–25 wt. % of the polymer mixture, and more preferably within the range of 10–15 wt. % of the polymer mixture. Where the secondary polymer component is a metallocene-based copolymer, it is present in an amount of less than 5 wt. %. After mixing the two polymer components together, it is extruded and the formed into a biaxially oriented film by stretching the extruded polymer mixture in longitudinal and transverse directions.

In one embodiment of the invention, the primary polymer component is a high crystallinity isotactic propylene homopolymer having a xylene solubles content of no more than 1 wt. %. The primary polymer component contains, in addition to the high crystallinity isotactic polypropylene, a minor amount of an opaque polymer mixture comprising an isotactic propylene homopolymer and a non-polymeric filler material. Preferably, the opaque polymer mixture contains the primary polymer component and the isotactic propylene homopolymer in a weight ratio within the range of 5:5 to 9:1 and more preferably, about 7:3. In this embodiment of the invention, the secondary polymer component preferably is a metallocene-produced ethylene-propylene random copolymer produced by the polymerization of propylene and ethylene in the presence of a metallocene polymerization catalyst. More preferably, the metallocene-produced ethylene-propylene random copolymer has an ethylene content of no more than 4 wt. % and has a melting temperature of no more than 125° C.

In a further embodiment of the invention, the high crystallinity isotactic propylene homopolymer has a xylene solubles content of no more than 1 wt. % and the secondary component is a metallocene polymerized ethylene-propylene random copolymer having a low melting temperature of no more than 110° C. The ethylene-propylene random copolymer is present in an amount within the range of 1–10 wt. % and preferably within the range of 3–5 wt. %.

In a preferred embodiment of the invention in which the primary polymer component is a high crystallinity isotactic homopolymer with a xylene content of no more than 1 wt. %, the secondary polymer component comprises a Ziegler-Natta propylene polymerized ethylene-propylene random copolymer as described above in an amount within the range of 10–15 wt. % of the polymer blend and has a xylene solubles content of at least three times the xylene solubles content of the primary polymer component. Preferably, the secondary polymer component has a melting temperature which is lower than the melting temperature of the primary polymer component by an incremental amount of at least 5° C.

In a further embodiment of the invention in which the secondary polymer component comprises a metallocene-polymerized ethylene-propylene random copolymer, the secondary polymer component has an ethylene content of no more than 6 wt. % and a melting temperature of no more than 125° C. In this specific embodiment of the invention, the secondary polymer component has an ethylene content within the range of 2–4 wt. % and a xylene solubles content within the range of 0.1–5 wt. %. In a further embodiment of the invention, the secondary polymer component has an ethylene content within the range of 2–3 wt. % and a xylene solubles content within the range of 0.2–2.5 wt. %.

DETAILED DESCRIPTION OF THE INVENTION

Figure 1:
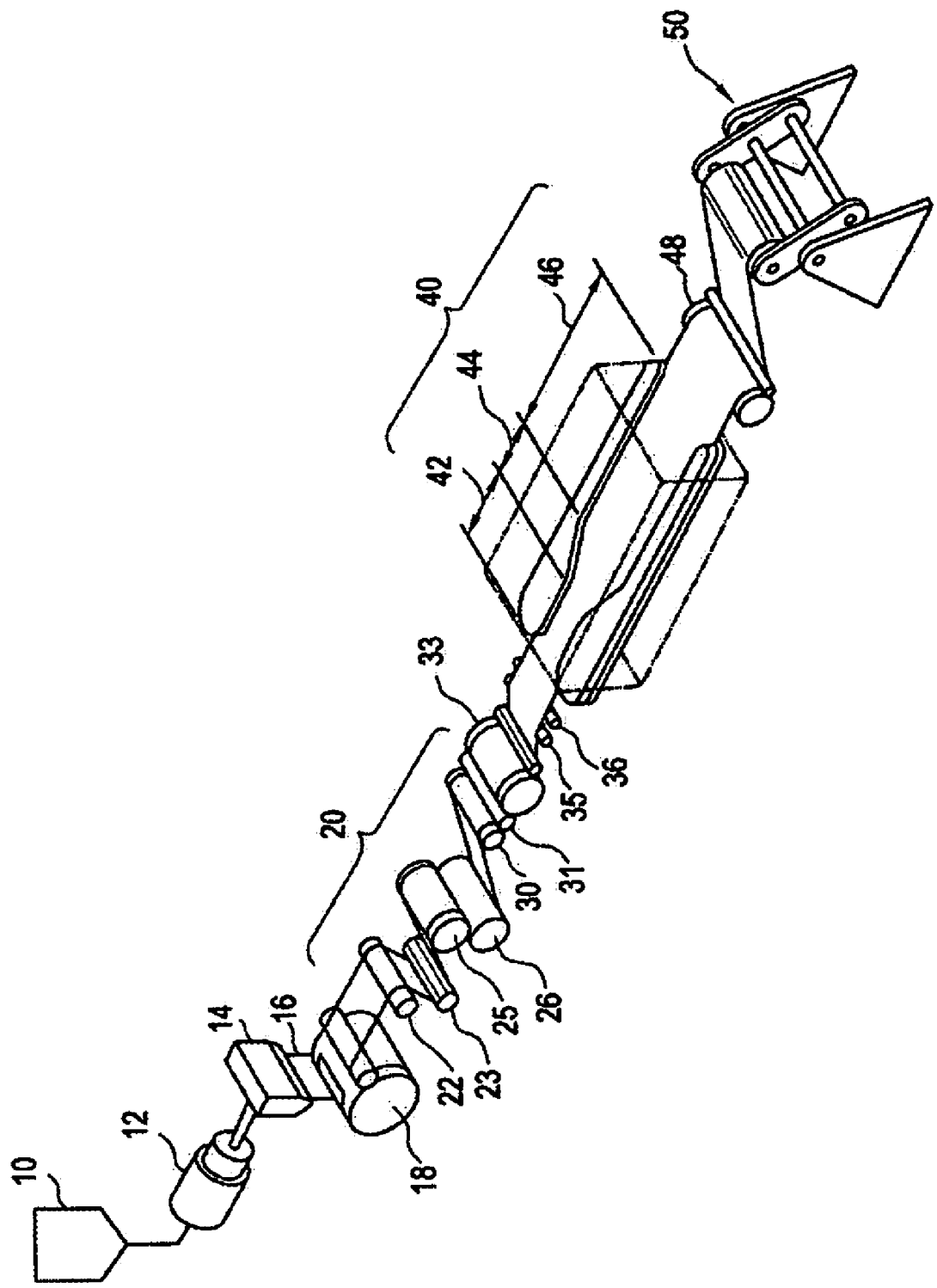
FIG. 1 is a schematic illustration of a tenter-frame system for producing biaxially oriented polypropylene films.

The process of the present invention involves a novel process for the production of biaxially oriented films through the use of two polymer components characterized herein as a primary polymer component, which is present in the mixture in the predominant amount, and a secondary polymer component, which is present in the mixture in a relatively minor amount. The primary polymer component is an isotactic propylene homopolymer which is polymerized using a Ziegler-Natta catalyst which may be of a type as described in greater detail below. The secondary polymer component is a Ziegler-Natta polymerized ethylene-propylene random copolymer or a metallocene ethylene-propylene random copolymer produced by the copolymerization of propylene and ethylene, the latter in a relatively small amount, in the presence of an isospecific metallocene catalyst as described below.

The isotactic propylene homopolymers and ethylene-propylene copolymers prepared through the use of conventional Ziegler-Natta catalysts of the type disclosed, for example, in U.S. Pat. Nos. 4,298,718 and 4,544,717, both to Myer et al. Catalysts employed in the polymerization of alpha-olefins may be characterized as supported catalysts or unsupported catalysts, sometimes referred to as homogeneous catalysts. Ziegler-Natta catalysts are normally supported catalysts, such as titanium tetrachloride supported on an active magnesium dichloride as disclosed, for example, in the aforementioned patents to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such and an alkylaluminum compound, for example, triethylaluminum (TEAL). The Myer '717 patent discloses a similar compound which may also incorporate an electron donor compound which may take the form of various amines, phosphenes, esters, aldehydes, and alcohols.

Metallocene catalysts as described below, may be employed as unsupported or supported catalyst components. Metallocenes that produce isotactic polyolefins are disclosed in U.S. Pat. No. 4,794,096. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2HfQp \qquad (1)$$

In formula (1), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Another preferred isospecific metallocene for use in producing the polymers in accordance with the present invention include those incorporating bisindenyl ligand structures. One such ligand structure is a dimethyl silyl-bridged metallocene as characterized by the following formula:

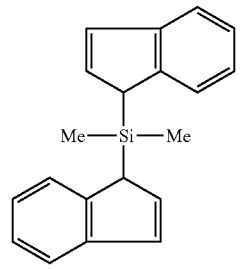

Yet another isospecific metallocene is based upon an isopropylidene-bridged cyclopentadienyl fluorenyl ligand structure in which the cyclopentadienyl group is substituted at the proximal position by a methyl group and at the distal position by a relatively bulky group, such as a tertiary butyl group as indicated by the following formula:

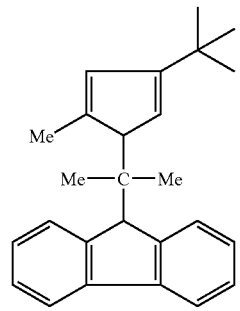

Isospecific metallocenes such as those described above are disclosed in U.S. Pat. Nos. 5,158,920 and 5,416,228.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, so-called cationic metallocenes are disclosed in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Similar relationships can be established for isospecific metallocenes.

While metallocene catalysts are often used as homogeneous catalysts, they also may be supported. As disclosed in U.S. Pat. Nos. 4,701,432 and 4,808,561, both to Welborn, a metallocene catalyst component may be supported on a support or carrier such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, can also be incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. No. 5,308,811 to Suga et al and U.S. Pat. No. 5,444,134 to Matsumoto.

Polyolefin compositions which can be oriented at variable process conditions, particularly over a range of machine direction orientation draw ratios and transverse direction orientation oven temperatures, are desirable for a number of reasons. Film manufacturers have the flexibility to vary one or more processing conditions within an acceptable range for a particular film production run. In addition, the possibility of a web break during the orientation process is lessened, resulting in lower processing line start up costs. For example, a standard machine direction orientation draw ratio is about 5 times the original length of the polyolefin film. A standard transverse direction oven temperature is about 166° C. These processing conditions are considered standard in that the occurrence of web breaks in the film are infrequent. The ability to orient film compositions under variable conditions, for example a machine direction draw ratio within the range of its standard up to 9 times the original length, and a transverse direction oven temperature within the range of its standard to about 20° C. less than the standard, gives manufacturers greater latitude in the production of film products. A further processing advantage is the ability to draw the film at higher line speeds thereby decreasing the manufacturing time.

Biaxially-oriented films can have a number of properties to their advantage during and after the machine processing steps. A relatively low coefficient friction is desirable, both during the biaxially orientation procedure and in the use of the ultimately-produced biaxially-oriented film for end use applications. A relatively high stiffness, as indicated by tensile moduli in both the machine direction and the transverse direction is usually advantageous. The 1% secant modulus is a measure of the stiffness of the oriented film after it is stretched by 1% after orientation. The secant modulus is normally much higher than the machine direction strength. Relatively low permeabilities to gas and water are desirable. In addition, a high shrinkage factor of the processed film, while undesirable in some cases, can be advantageous in others, such as where the film is used in stretch wrapping of food products, electrical components, and the like.

Properties of the resulting film product can be dependent to a certain degree on the particular process conditions under which the polyolefin composition was manufactured. For example, a stiffer film with a higher shrinkage factor and better barrier properties would result from an orientation process incorporating a larger machine direction orientation draw ratio. Likewise, the transverse direction orientation oven temperature would affect the properties of the resulting oriented film product, particularly improving the shrinkage factor.

The physical and optical properties of films are important in the film industry and should fall within certain parameters for different film applications. The optical properties include haze, contact clarity (NAS), and gloss. Haze is a phenomena of light scattering and arises from local variations in the refractive index. Haze is defined as the relative fraction of scattered intensity from the dispersed particles in all directions, being detected in a range of wide angle, to the incident light intensity. Contact clarity or NAS is a measure of contact clearness or see-through quality and is different from haze due to the direct transmittance of light. For example, some films may indeed be hazy but appear clear as the film is in contact with the contents of a package. Unlike haze, NAS clarity is distance dependent so that the thinner the film, the better the contact clarity. Gloss is defined as the ratio of the reflected light intensity from the film at a specific angle of incidence light to that of a standard with the ideal smooth surface.

As noted previously, biaxially oriented films are characterized in terms of certain well-defined characteristics relating to their stereoregular structures and physical properties, including melt temperatures and shrinkage characteristics, as well as in relatively low coefficients of friction and relatively high tensile moduli and good barrier properties including relatively low permeation rates to oxygen and water. The biaxially-oriented films of the present invention are formed using composition of particularly configured primary and secondary polymer components as described in greater detail below and by using any suitable oriented film production technique, such as the conventionally-used tenter frame process.

The present invention addresses oriented films involving the combination of two isotactic polymers in a polymer blend which is extruded and oriented. The polymer blend may also include minor amounts (typically less than 1 wt. %, and more typically less than 0.5 wt. %) of additives designed to enhance other physical or optical properties. Such mixtures may have, for example, one or more antioxidants present in an amount totaling no more than about 0.25 wt. % and one or more acid neutralizers present in an amount totaling no more than about 0.25 wt. %. Additives acting as anti-block agents may also be present, again in relatively low percentages such as no more than about 1 wt. %, more preferably no more than about 0.5 wt. %, and even more desirably no more than about 0.25 wt. %.

Other additives can be used in the polyolefins to affect various parameters of the biaxial oriented machine process conditions and the physical properties of the end film product. Among such additives are resin or rosin-type modifiers of the type disclosed, for example, in U.S. Pat. No. 5,213,744 to Bossaert, the entire disclosure of which is incorporated herein by reference. A wide range of such additives are disclosed in Bossaert including hydrocarbon resins, such a polyturpine resins; petroleum resins; various rosin derivatives, including rosin alcohols and esters; and hydrogenated natural wood rosins. The polymer components may be physically blended prior to melt blending or may be melt blended in a screw extruder or kneader in amount proportionate to the relative amounts desired in the final product.

The use of primary and secondary polymer components in accordance with the invention can be employed to improve the processability of the polyolefin composition in forming films in commercial biaxially oriented polypropylene lines. The improved processability can be measured in terms of machine direction orientation draw ratio and transverse direction orientation oven temperature. During biaxial orientation, the occurrence of web breaks in the film of the present invention is less frequent at standard machine direction orientation draw ratios and transverse direction orientation oven temperatures. Accordingly, the draw ratios in the machine direction can be increased and the oven temperatures of the transverse direction orientation can be lowered while processing the composition of the present invention with few web breaks. In addition, the drawability of the polyolefin composition can be accomplished at higher line speeds. The polyolefin compositions used in the present invention are desirable in that these physical and optical properties of the resulting film product are not significantly altered by the variable processing conditions.

In general, biaxially oriented film production can be carried out by any suitable technique, such as disclosed for example, in Canadian Patent Application No. 2,178,104 to Peiffer et al. As described in the Peiffer et al application, the entire disclosure of which is incorporated herein by reference, the polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment), as described, for example, in the aforementioned Canadian Patent Application No. 2,178,104 or in U.S. Pat. No. 4,692,380 to Reid, the entire disclosure of which is incorporated herein by reference. The film may also be metallized as described in U.S. Pat. No. 4,692,380 to Reid. While corona and flame treatment typically occurs immediately following orientation and prior to the initial roll up, metallizing is typically performed at a separate time and location.

Turning now to FIG. 1, there is shown a schematic illustration of a suitable "Tenter Frame" orientation process which may be employed in producing biaxially-oriented polypropylene film in accordance with the present invention. More particularly and with reference to FIG. 1, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature within the range of about 30–60° C. The film is drawn off the chill roller 18 to a stretching section 20 to which the machine direction orientation occurs by means of idler rollers 22 and 23 which lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and then passed to the slow roller 30 of the longitudinal orienting mechanism. The slow roller may be operated at any suitable speed, usually about 20–40 feet per minute in this type of pilot production line. The fast roller 31 is operated at a suitable speed, typically about 150 feet per minute in a pilot line, to provide a surface speed at the circumference of about 4–7 times that of the slow roller in order to orient the film in the machine direction. In a commercial production line, casting speeds may be much higher such as 20–60 meters per minute, with 120–360 meters per minute in final speeds.

As the oriented film is withdrawn from the fast roller, it is passed over a roller 33 at room temperature conditions. From here it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. Lateral stretching ratios are typically greater than machine direction stretch ratios and often range anywhere from 5–12 times the original width. Ratios of 8–10 times are usually preferred. The concluding portion of the lateral stretching phase includes an annealing section 46, such as an oven housing, where the film is heated at a temperature within the range of 130–170° C. for a suitable period in time, about 1–10 seconds. The annealing time helps control certain properties, and increased annealing is often specifically used to reduce shrinkage. The biaxially oriented film is then withdrawn from the tenter frame and passed over a chill roller 48 where it is reduced to a temperature of less than about 50° C. and then applied to take-up spools on a take-up mechanism 50. From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section.

The present invention provides a process for the production of polyolefin films in which solid state stretching is eased during the film forming process while maintaining or enhancing desirable film properties, such as good gloss characteristics and reduced haze. The invention is carried out with a mixture of at least two polymer components characterized herein as a primary polymer component and a secondary polymer component. The primary polymer component is isotactic polypropylene which is produced in the presence of a Ziegler-Natta catalyst as described previously. The primary polymer component is the predominant polymer in the polymer mixture. The secondary polymer component is an ethylene-propylene random copolymer which is present in the mixture in a relatively small amount and may be a Ziegler-Natta-based polymer or a metallocene-based polymer as described previously. Where the secondary component is a metallocene random copolymer (MRCP), it normally will be employed in relatively small amounts of less than 5 wt. % and preferably within the range of 3–5 wt. %. Where the secondary polymer component is a Ziegler-Natta random copolymer (ZNRCP), larger amounts of the secondary polymer component are employed. Preferably, the secondary polymer component ZNRCP is present in the polymer mixture in an amount within the range of 10–15 wt. %.

Exemplary of primary polymer composition which may be employed in the present invention are two isotactic Ziegler-Natta based isotactic polypropylenes identified herein as polymer P1 and polymer P2. Polymer P1 is a very high crystallinity isotactic polypropylene having a xylene solubles content of about 1 wt. % or less. In experimental work respecting the invention, this high crystallinity polypropylene was employed as a "neat" polymer component and in an admixture with a minor amount of an opaque polymer mixture composed of a high crystallinity isotactic polypropylene and a non-polymeric filler material. The opaque polymer mixture, identified herein as P3, was employed in an amount to provide a weight ratio of the high crystallinity isotactic polypropylene to the opaque polymer mixture of about 7:3.

Polymer P2, exemplary of another primary polymer component which can be employed in carrying out the present invention, is a Ziegler-Natta polymerized propylene homopolymer having a somewhat higher xylene solubles content than polymer P1. Polymer P2 has a xylene solubles content of about 3.8 wt. % as contrasted with the xylene solubles content of about 0.8 wt. % for polymer P1. Polymer P1 has a melt temperature of about 165° C. and a crystallization temperature of 110.6° C. Polymer P2 exhibits a melt temperature of 160.7° C. and a crystallization temperature of 116.1° C. The polymer P3 employed in admixture with the high crystallinity polymer P1 has a melt temperature of 159.7° C. and a crystallization temperature of 114° C.

The following are examples of secondary components which may be employed in the present invention. Polymer S1 is a Ziegler-Natta polymerized ethylene-propylene random copolymer having a xylene solubles content of 2.93 wt. %, an ethylene content of 0.42 wt. % and a melt temperature of about 155° C. Other secondary polymer components suitable for use in the invention are metallocene-polymerized ethylene-propylene random copolymers identified herein as S2, S3 and S4. Polymer S2 has a xylene solubles content of about 0.5 wt. % and an ethylene content of 3.2 wt. %. This polymer has a melt temperature of 122.7° C. and a crystallization temperature of 82.6° C. Polymer S3 has an ethylene content of about 2.4 wt. % and a melting temperature of about 119° C. Polymer S4 has a relatively low melt temperature of 106° C. and a crystallization temperature of 80.1° C. This polymer has a xylene solubles content of 0.52 wt. % and an ethylene content of 4.7 wt. %.

In one set of experiments respecting the invention, the primary polymer component P1 was employed alone and in admixture with 10 wt. % and 15 wt. % of the secondary polymer component S1 to produce film compositions which were evaluated in terms of tensile properties and gloss, haze and water permeation characteristics. Film sheets based upon the three compositional mixtures (polymer P1 alone, 90/10 wt. % P1/S1, and 85/15 wt. % P1/S1) were cast into 0.018 inch thick sheets which were stretched into film at 6×6 draw ratios at a speed of 30 meters/minutes after 30 seconds preheating at temperatures ranging from 135–155° C. As indicated by the results discussed below, the stretching behavior of the primary polymer component P1 was advantageously affected by adding the Ziegler-Natta random copolymer S1 at the 10 and 15 wt. % quantities investigated. The improved stretching characteristics were characterized by the decreased values for yield stress, final draw stress and apparent drawing toughness. Desirable physical characteristics in terms of higher gloss and lower haze were also achieved.

Figure 2:
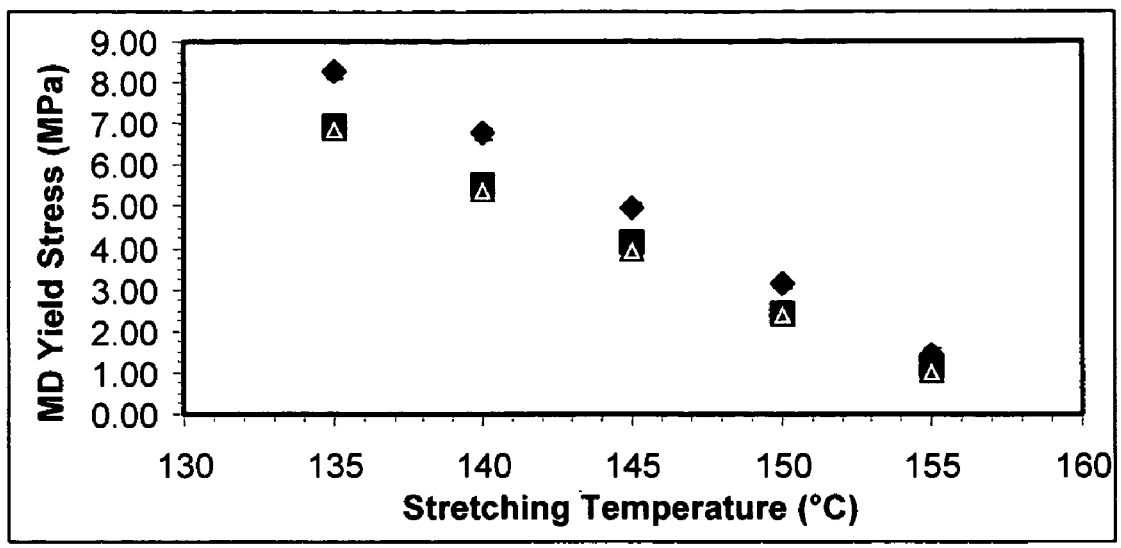
FIG. 2 is a graph of MD yield stress versus stretching temperature for a primary polymer—secondary polymer system exemplary of the invention.

The machine direction yield stress in terms of increasing stretching temperature is illustrated in FIG. 2 which shows yield stress in MPa plotted on the ordinates vs. stretching temperature in ° C. plotted on the abscissa. In FIG. 2, the yield stress values for the 100% polymer P1 are indicated by ♦ with the values for the 90/10 primary component/secondary component mixture and an 85/15 mixture indicated by data points ■ and ▲, respectively. As can be seen by an examination of FIG. 2, substantially identical results are achieved at the 10 and 15 wt. % secondary component content across the temperature range investigated.

Figure 3:
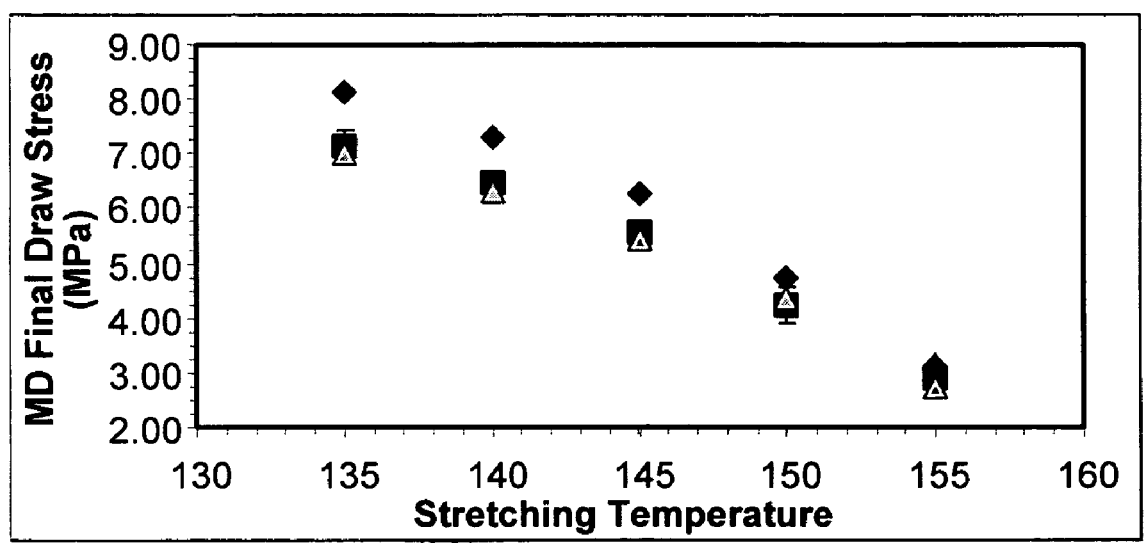
FIG. 3 is a graph of MD final draw stress versus stretching temperature for the polymer system of FIG. 2.
Figure 4:
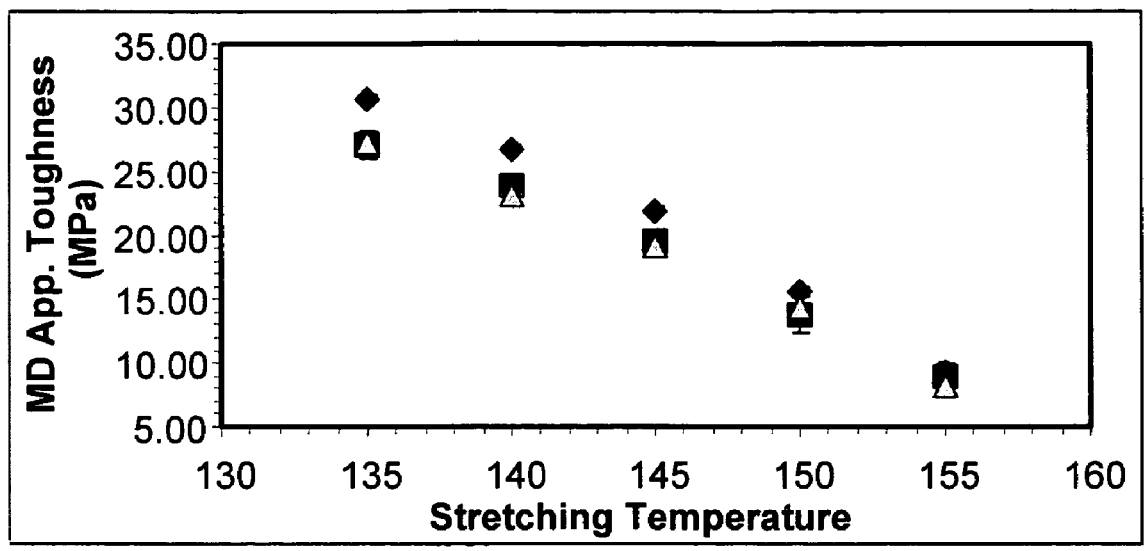
FIG. 4 is a graph of MD apparent toughness versus stretching temperature for the polymer system of FIG. 2.

Similar results in terms of machine direction final draw stress and machine direction apparent toughness are shown in FIGS. 3 and 4, respectively. In FIGS. 3 and 4, the final draw stress and the apparent toughness are plotted on the ordinate vs. stretching temperature on the abscissa with the same data points as used in FIG. 2 employed for the 100% P1, the 90/10% P1/S1 and the 85/15% P1/S1 mixtures.

The film direction tensile properties after stretching at 135° C. and 155° C. are presented in Tables 1 and 2, respectively.

TABLE 1

| Film Property | P1 | P1/S1 (90/10 wt. %) | P1/S1 (85/15 wt. %) |
|---|---|---|---|
| Tensile Strength, Max, MD (psi) | 31934 (±1761) | 26887 (±1831) | 28502 (±387) |
| Elongation, Max, MD (%) | 64.1 (±8.5) | 46.2 (±3.3) | 52.9 (±6.1) |
| 1% Secant Modulus, MD (psi) | 416907 (±47094) | 285185 (±5580) | 257709 (±6499) |

TABLE 2

| Film Property | P1 | P1/S1 (90/10 wt. %) | P1/S1 (85/15 wt. %) |
|---|---|---|---|
| Tensile Strength, Max, MD (psi) | 18836 (±975) | 23387 (±1459) | 22530 (±1334) |
| Elongation, Max, MD (%) | 46.3 (±3.9) | 55.1 (±5.9) | 50.2 (±4.6) |
| 1% Secant Modulus, MD (psi) | 248130 (±3781) | 266496 (±2870) | 259610 (±1465) |

The film optics of the polymer component alone and the primary/secondary polymer component mixtures are set forth in Tables 3 and 4, respectively. As indicated by the data presented in Tables 3 and 4, film optics, in terms of reduced haze and enhanced gloss, were achieved through the use of the secondary polymer components at stretching temperatures of 155° C.

TABLE 3

HAZE

| Stretch Temp. (° C.) | P1 | P1/S1 (90/10 wt. %) | P1/S1 (85/15 wt. %) |
|---|---|---|---|
| 135 | 0.7 (±0.03) | 0.4 (±0.02) | 0.3 (±0.03) |
| 145 | 0.4 (±0.03) | 0.3 (±0.03) | 0.3 (±0.02) |
| 155 | 15.8 (±0.7) | 0.6 (±0.04) | 0.5 (±0.03) |

TABLE 4

GLOSS

| Stretch Temp. (° C.) | P1 | P1/S1 (90/10 wt.%) | P1/S1 (85/15 wt.%) |
|---|---|---|---|
| 135 | 92.2 (±0.85) | 94.7 (±0.24) | 94.5 (±0.68) |
| 145 | 92.3 (±1.35) | 94.5 (±0.49) | 94.2 (±1.43) |
| 155 | 63.8 (±3.58) | 92.8 (±0.41) | 93.1 (±0.96) |

In further experimental work respecting the invention, the metallocene-ethylene-propylene copolymer S2 was used as a modifier in combination with two primary polymer components, the isotactic Ziegler-Natta homopolymer P1 alone, and the homopolymer P1 mixed with the opaque polymer P3. Where the composite primary polymer component was employed, it involved a 70:30 ratio of the polymers P1 and P3. The secondary polymer additive was added to the primary polymer component in an amount of 4 wt. %.

Figure 5:
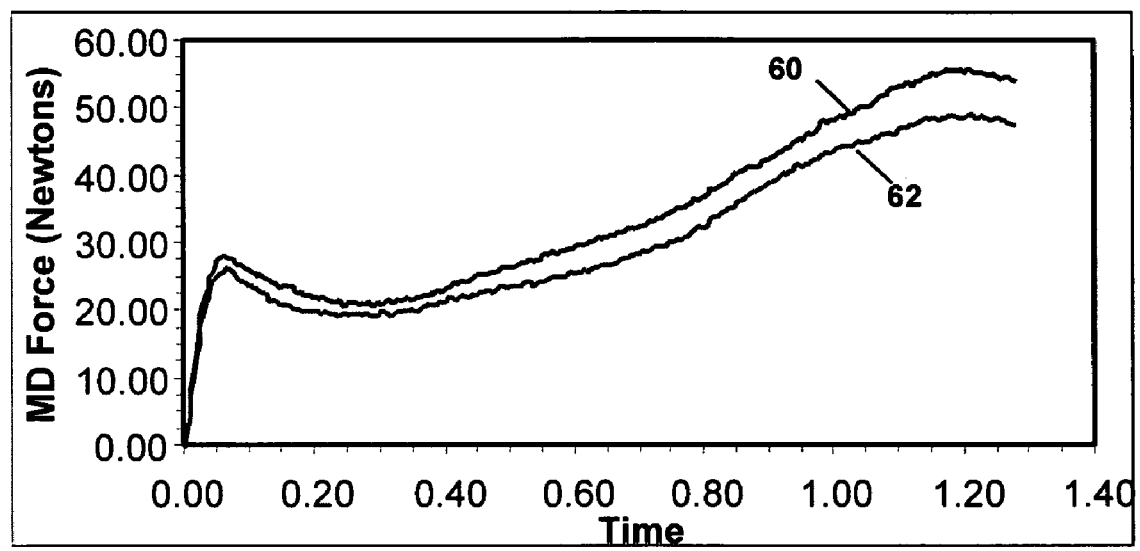
FIG. 5 is a graph of machine direction force versus time for uniaxial drawing of another polymer system exemplary of the invention.

The polymer mixtures were formed into sheets and subjected to uniaxial orientation at a draw ratio of 10:1 and biaxial orientation at draw ratios of 6×6. The results of this experimental work are disclosed in FIGS. 5, 6 and 7. In FIG. 5, the machine direction force in Newtons at a drawing temperature of 145° C. is plotted on the ordinate vs. the time in seconds on the abscissa. Curve 60 in FIG. 5 shows the machine direction force for the polymer P1 without additives and curve 62 shows the corresponding data for the polymer P1 containing 4 wt. % of the metallocene-based random copolymer S2.

Figure 6:
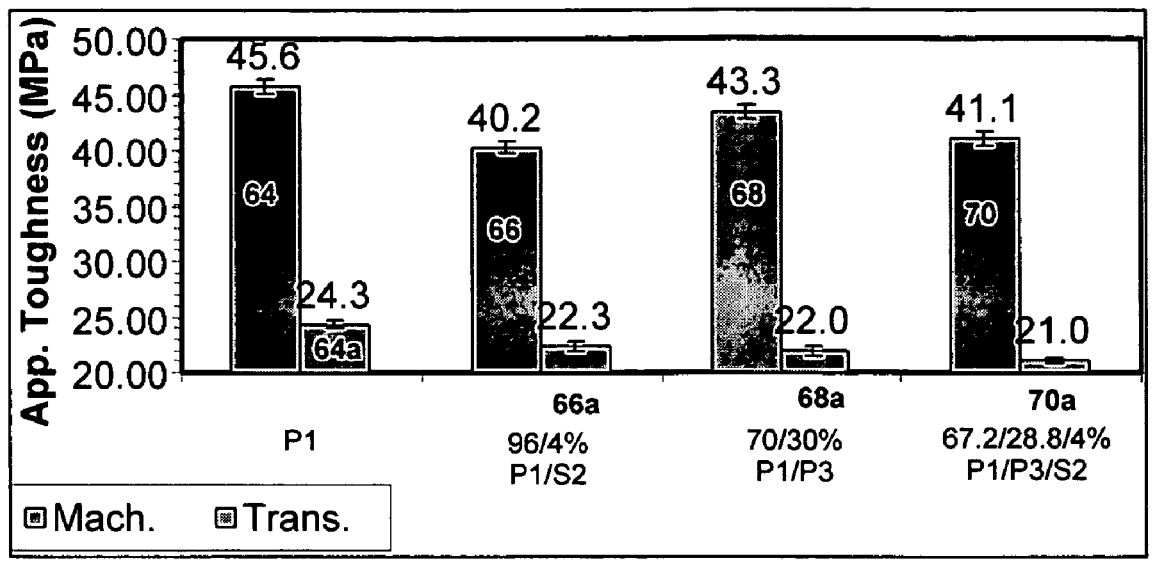
FIG. 6 is a graph showing MD and TD apparent toughness for 10×1 uniaxial drawing of the polymer system of FIG. 5.

FIG. 6 shows the machine direction (MD) and transverse direction (TD) toughness during uniaxial drawing at a 10:1 draw ratio, again at a drawing temperature of 145° C. In FIG. 2, bars 64 and 66 show the machine direction toughness for polymer P1 alone and the mixture of polymer P1 and S2, respectively. Bars 64a and 66a show the corresponding transverse direction toughness for these two formulations.

Bars 68 and 68a in FIG. 6 show the machine direction toughness and transverse direction toughness for the 70/30 mixture of polymer P1 and polymer P3. Bars 70 and 70a in FIG. 6 show the machine direction toughness and transverse direction toughness, respectively, for the same formulation containing also 4 wt. % of the secondary polymer additive S2.

Figure 7:
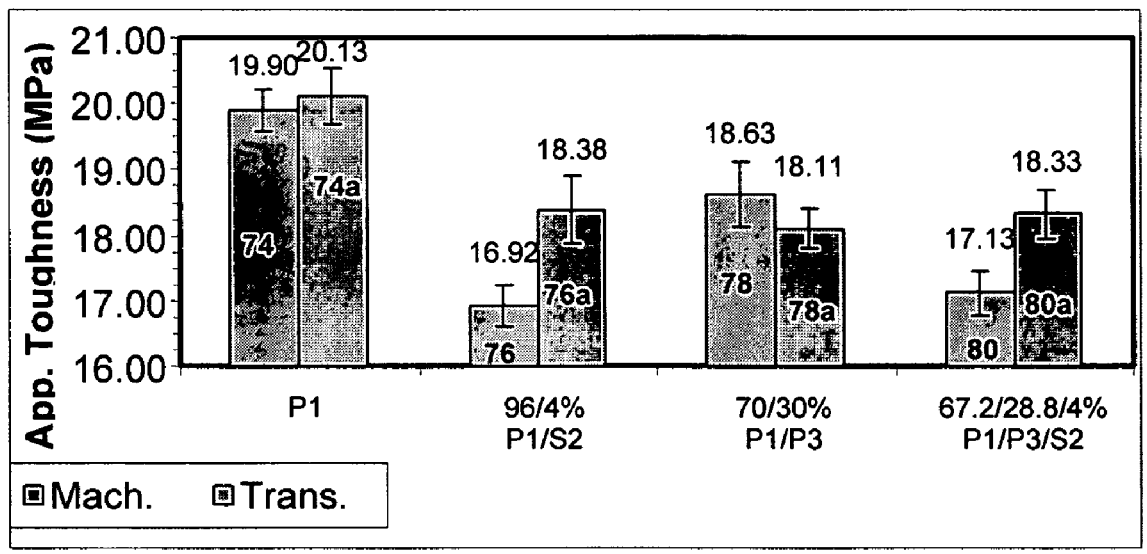
FIG. 7 is a graph of MD and TD apparent toughness for biaxial stretching of the polymer system of FIG. 5.

FIG. 7 illustrates the machine direction and transverse direction toughness during 6×6 biaxial stretching at a drawing temperature of 145° C. Bars 74 and 74a illustrate the MD and TD figures for the P1 polymer alone and bars 76 and 76a show the corresponding data for this polymer containing 4 wt. % of polymer S2. Similarly, bars 78 and 78a show the machine direction and transverse direction data for the 70/30 mixture and bars 80 and 80a show the machine direction and transverse direction values for the 70/30 mixture containing 4 wt. % of the S2 polymer.

Figure 8:
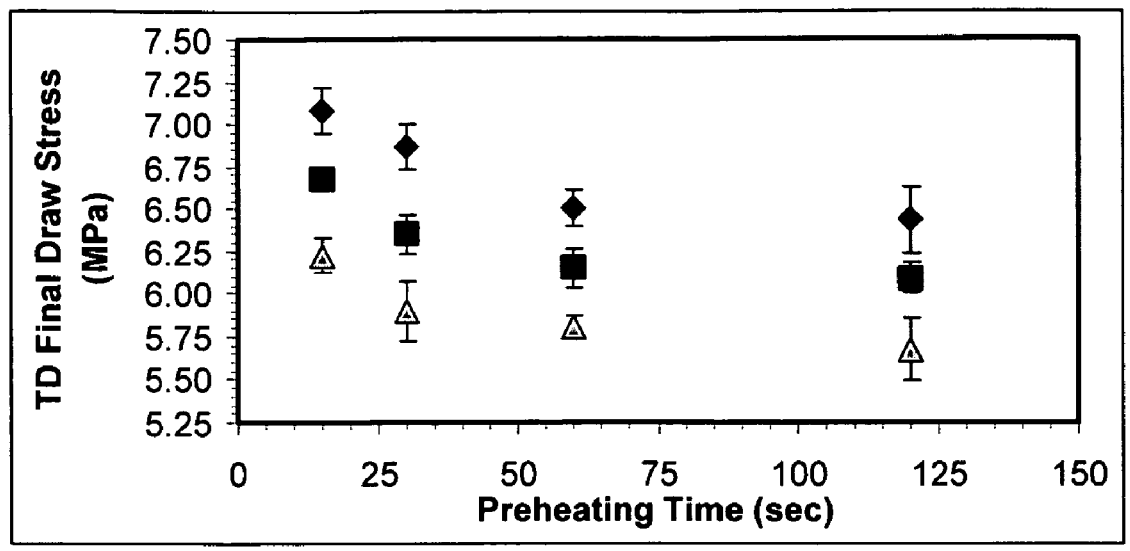
FIG. 8 is a graph of TD final draw stress versus preheating time for another polymer system exemplary of the invention.
Figure 9:
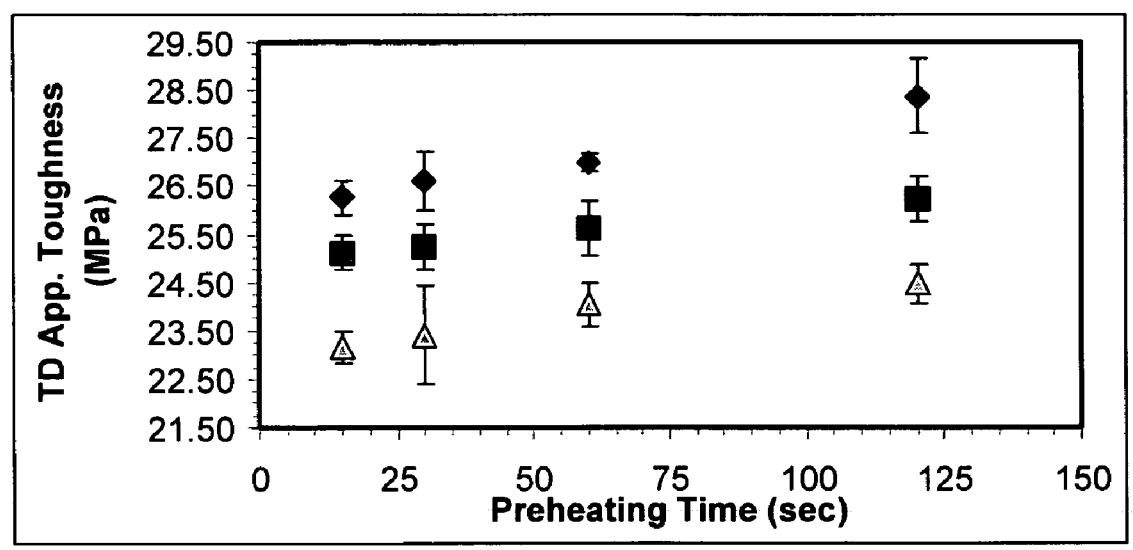
FIG. 9 is a graph of TD apparent toughness versus preheating time for another polymer system exemplary of FIG. 8.
Figure 10:
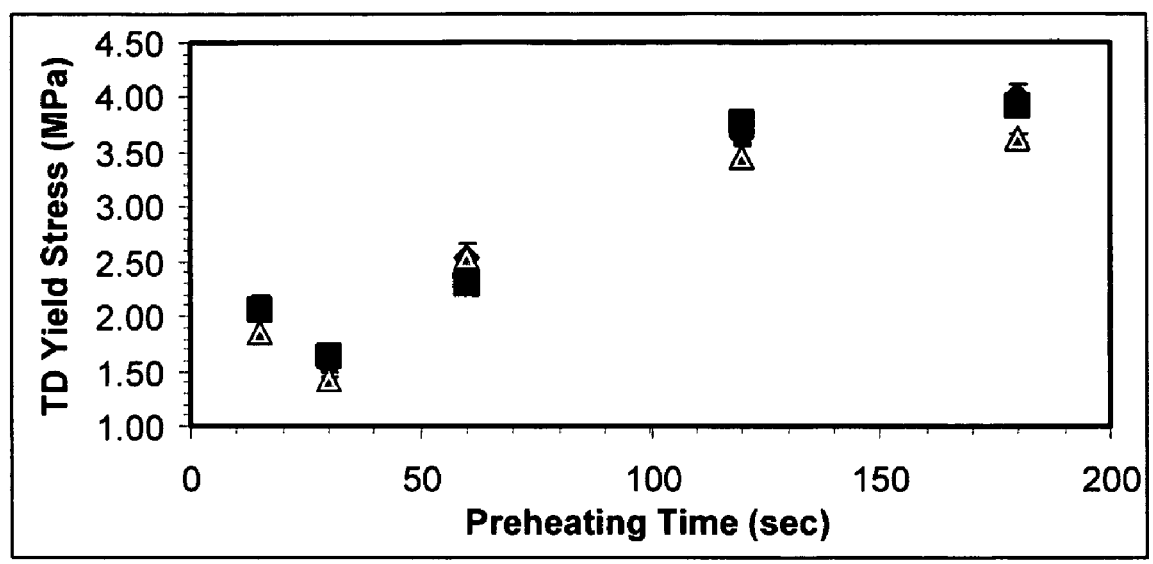
FIG. 10 is a graph of TD yield stress versus preheating time for the polymer system of FIG. 8 at 155° C. stretching.
Figure 11:
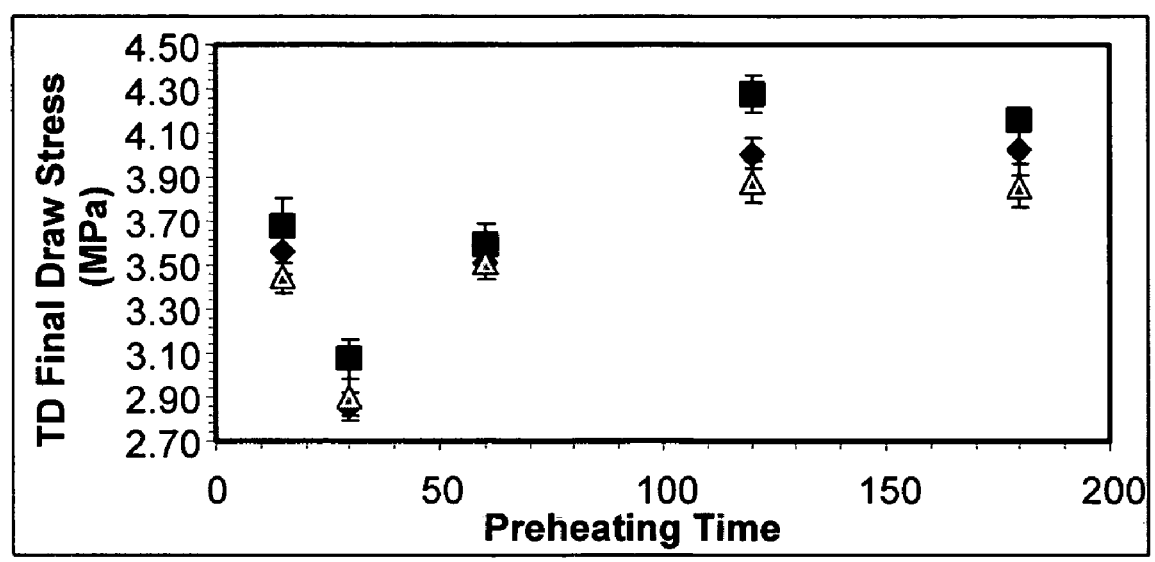
FIG. 11 is a graph of TD final draw stress versus preheating time for the polymer system of FIG. 8 at 155° C. stretching.
Figure 12:
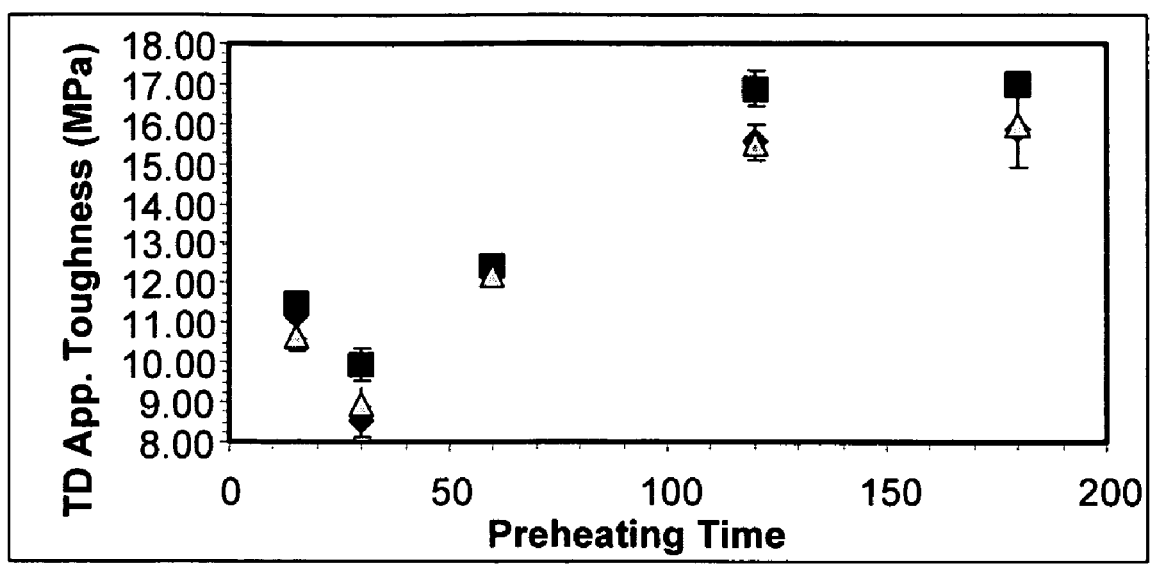
FIG. 12 is a graph of TD apparent toughness versus preheating time for the polymer system of FIG. 8 at 155° stretching.

Additional experimental work was carried out employing the primary polymer component P1 alone and in admixture with 2 and 4 wt. % of the secondary polymer component, S3. In this experimental work, the films were stretched at 140 and 155° C., employing preheating times ranging from 15 seconds to 180 seconds. The results in terms of transverse direction stresses and apparent toughness are illustrated in FIGS. 8–12. In each of FIGS. 8–12, the measured physical parameters are indicated by ♦ for films formed of the polymer P1 alone, by ■ for the polymer P1 containing 2 wt. % of S3, and by ▲ for the primary polymer component containing 4 wt. % of the secondary polymer component S3. In FIGS. 8 and 9, the transverse direction final draw stress and the transverse direction apparent toughness, both in MPa, are plotted on the ordinate vs. preheating time in seconds on the abscissa for the films stretched at 140° C. FIGS. 10 and 11 illustrate the transverse direction yield stress and the transverse direction final draw stress, both in MPa, plotted on the ordinate vs. the preheating time in seconds plotted on the abscissa for films stretched at 155° C. FIG. 12 illustrates the transverse direction toughness in MPa plotted on the ordinate vs. the preheating time in seconds plotted on the abscissa for the films, again at a stretching temperature of 155° C.

The use of the secondary polymer component S3 at the relatively low concentrations of less than 5% inhibited surface distortions at high stretching temperatures with short preheating times, resulting in film products which were smoother than the film products formed from the primary polymer component alone. The use of the secondary polymer component at both 2 and 4 wt. % reduced the stretching forces, particularly at 140° C., from those required for the primary polymer component alone.

Having described specific embodiments of the present invention, it will be understood that modifications thereof may be suggested to those skilled in the art, and it is intended to cover all such modifications as fall within the scope of the appended claims.

The invention of the claim is:
1. In a process for producing a polyolefin film comprising:
   providing a primary polymer component comprising an isotactic propylene homopolymer produced by the polymerization of propylene in the presence of a Ziegler-Natta catalyst;
   providing a secondary polymer component selected from the group consisting of:
      a Ziegler-Natta polymerized ethylene-propylene random copolymer containing no more than 0.5 wt. % ethylene and having a xylene solubles content of at least 2 wt. % content; and
      a metallocene-polymerized ethylene-propylene random copolymer produced by the copolymerization of propylene and ethylene in the presence of a metallocene polymerization catalyst;
   mixing said primary and secondary polymer components together to provide a mixture of said primary and secondary polymer components, wherein the secondary polymer component is present in an amount of from 5 to 25 wt. % when the secondary polymer component is the Ziegler-Natta polymerized ethylene-propylene random copolymer and wherein the secondary polymer component is present in an amount of 5 wt. % or less when the secondary polymer component is the metallocene-polymerized ethylene-propylene random copolymer; and forming a biaxially oriented film layer of said polymer mixture by stretching said polymer mixture in longitudinal and transverse directions.

2. The process of claim 1 wherein said primary polymer component is a high crystallinity isotactic propylene homopolymer having a xylene solubles content of no more than 1 wt. % and contains, in addition to said high crystallinity isotactic polypropylene, a minor amount of an opaque polymer mixture comprising an isotactic propylene homopolymer and a non-polymeric filler material.

3. The process of claim 2 wherein said high crystallinity isotactic polypropylene and said opaque polymer mixture with said primary polymer component are present in amounts providing a weight ratio of said high crystallinity isotactic polypropylene to said opaque polymer mixture is within the range of 5:5 to 9:1.

4. The process of claim 3 wherein the weight ratio of said high crystallinity isotactic polypropylene to said opaque polymer mixture is about 7:3.

5. The process of claim 3 wherein said secondary polymer component is a metallocene-produced ethylene propylene random copolymer produced by the copolymerization of propylene and ethylene in the presence of a metallocene polymerization catalyst.

6. The process of claim 5 wherein said metallocene-produced ethylene-propylene random copolymer has an ethylene content of no more than 6 wt. %.

7. The process of claim 6 wherein said metallocene-produced ethylene-propylene random copolymer has a melting temperature of no more than 125° C.

8. The process of claim 1 wherein said primary polymer component is a high crystallinity isotactic propylene homopolymer having a xylene solubles content of no more than 1 wt. %.

9. The process of claim 8 wherein said secondary polymer component is a Ziegler-Natta polymerized ethylene-propylene random copolymer having a xylene solubles content of at least twice the xylene solubles content of said primary polymer component.

10. The process of claim 8 wherein said secondary polymer component is a metallocene-produced ethylene-propylene random copolymer having a melting temperature of no more than 125° C.

11. The process of claim 10 wherein said copolymer has a melting temperature of no more than 110° C.

12. The process of claim 10 wherein said metallocene-polymerized ethylene-propylene random copolymer is present in said mixture within the range of 1–5 wt. %.

13. The process of claim 12 wherein said metallocene-polymerized ethylene-propylene random copolymer is present in said mixture within the range of 3–5 wt. %.

14. The process of claim 12 wherein said metallocene-polymerized ethylene-propylene random copolymer has a melting temperature of no more than 110° C.

15. In a process for producing a polyolefin film comprising:

providing a primary polymer component comprising a high crystallinity isotactic propylene homopolymer having a xylene solubles content of no more than 1 wt. %, produced by the polymerization of propylene in the presence of a Ziegler-Natta catalyst;

providing a secondary polymer component comprising a Ziegler-Natta polymerized ethylene-propylene random copolymer containing no more than 0.5 wt. % ethylene and having a xylene solubles content of at least twice the xylene solubles content of said primary polymer;

mixing said primary and secondary polymer components together to provide a mixture of said primary and secondary polymer components in which the secondary polymer component is present in an amount within the range of 10–15 wt % of said polymer mixture; and forming a biaxially oriented film layer of said polymer mixture by stretching said polymer mixture in longitudinal and transverse directions.

16. The process of claim 15 wherein said secondary polymer component has a xylene solubles content which is at least three times the xylene solubles content of said primary polymer component.

17. The process of claim 15 wherein said secondary polymer component has a melting temperature which is lower than the melting temperature of said primary polymer component by an incremental amount of at least 5° C.

18. In a process for producing a polyolefin film comprising:

providing a primary polymer component comprising a high crystallinity isotactic propylene homopolymer having a xylene solubles content of no more than 1 wt. %, produced by the polymerization of propylene in the presence of a Ziegler-Natta catalyst;

providing a secondary polymer component comprising a metallocene-polymerized ethylene-propylene random copolymer produced by the copolymerization of propylene and ethylene in the presence of a metallocene polymerization catalyst;

mixing said primary and secondary polymer components together to provide a mixture of said primary and secondary polymer components in which the secondary polymer component is present in an amount of less than 5 wt. %; and forming a biaxially oriented film layer of said polymer mixture by stretching said polymer mixture in longitudinal and transverse directions.

19. The process of claim 17 wherein said secondary polymer component has an ethylene content of no more than 6 wt. %.

20. The process of claim 17 wherein said secondary polymer component has a melting temperature of no more than 125° C.

21. The process of claim 19 wherein said secondary polymer component has an ethylene content within the range of 2–4 wt. %.

22. The process of claim 20 wherein said secondary polymer component has a xylene solubles content within the range of 0.1–5 wt. %.

23. The process of claim 18 wherein said secondary polymer component has an ethylene content within the range of 2–3 wt. %.

24. The process of claim 23 wherein said secondary polymer component has a xylene solubles content within the range of 0.2–2.5 wt. %.

25. The process of claim 18 wherein said metallocene-polymerized ethylene-propylene random copolymer has a melting temperature of no more than 110° C.

26. In a process for producing a polyolefin film comprising:

providing a primary polymer component comprising a high crystallinity isotactic propylene homopolymer having a xylene solubles content of no more than 1 wt.

%, produced by the polymerization of propylene in the presence of a Ziegler-Natta catalyst;

providing a secondary polymer component comprising a metallocene-polymerized ethylene-propylene random copolymer having a melting temperature of no more than 110° C., produced by the copolymerization of propylene and ethylene in the presence of a metallocene polymerization catalyst;

mixing said primary and secondary polymer components together to provide a mixture of said primary and secondary polymer components in which the secondary polymer component is present in an amount of 1–10 wt. %; and forming a biaxially oriented film layer of said polymer mixture by stretching said polymer mixture in longitudinal and transverse directions.

27. The process of claim 26 wherein said secondary polymer component is present in an amount within the range of 3–5 wt. %.

* * * * *